United States Patent
Yamada et al.

(10) Patent No.: US 6,297,457 B1
(45) Date of Patent: Oct. 2, 2001

(54) HARNESS GROMMET

(75) Inventors: Hiroaki Yamada, Shizuoka; Shunsaku Takeuchi, Aichi, both of (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/408,559

(22) Filed: Sep. 30, 1999

(30) Foreign Application Priority Data

Sep. 30, 1998 (JP) ................................. 10-276682

(51) Int. Cl.⁷ .................................................. H01B 17/26
(52) U.S. Cl. ........................... 174/152 G; 174/65 G; 174/153 G; 16/2.1
(58) Field of Search ..................... 174/65 G, 151, 174/135, 153 G, 152 G, 167; 16/2.1, 2.2, 2.3; 248/56

(56) References Cited

U.S. PATENT DOCUMENTS

| 1,800,578 | * | 4/1931 | Webb | 16/2.1 |
| 4,685,173 | | 8/1987 | Pavur | 16/2 |
| 5,270,487 | | 12/1993 | Sawamura | 174/31 R |

FOREIGN PATENT DOCUMENTS

| 0 822 121 A3 | | 7/1999 | (EP) | B60R/16/02 |
| 2337642 | * | 11/1999 | (GB) | |
| 9-92060 | | 4/1997 | (JP) | H01B/17/58 |
| 9-161579 | | 6/1997 | (JP) | H01B/17/58 |
| 9-161581 | | 6/1997 | (JP) | H01B/17/58 |
| 11025786 | * | 1/1999 | (JP) | |
| 11248044 | * | 9/1999 | (JP) | |
| 11306890 | * | 11/1999 | (JP) | |
| 11311374 | * | 11/1999 | (JP) | |

\* cited by examiner

*Primary Examiner*—Dean A. Reichard
*Assistant Examiner*—Angel R. Estrada
(74) *Attorney, Agent, or Firm*—Sughrue, Mion, Zinn, Macpeak & Seas, PLLC

(57) ABSTRACT

A harness grommet includes an inner tubular portion 3, provided within an outer tubular portion 2, and a flexible portion 4 extending from the inner tubular portion in a flaring manner. The flexible portion is turned back into the outer tubular portion to form a sound-insulating air layer. A cylindrical portion 6 extends from the flexible portion 4, and an inverting folding portion 5 is formed at the boundary between the flexible portion and the cylindrical portion, and a sound-insulating membrane 7 is formed by the flexible portion and the cylindrical portion. An outer diameter $D_1$ of the cylindrical portion 6 is larger than an inner diameter $D_2$ of the outer tubular portion.

5 Claims, 5 Drawing Sheets

HARNESS GROMMET

BACKGROUND OF INVENTION

1. Field of the Invention

This invention relates to a harness grommet, having a sound-insulating membrane forming a sound-insulating air layer within the grommet, in which the ability of inserting the sound-insulating membrane is enhanced, and also the withdrawal of this membrane is positively prevented.

2. Related Art

In an automobile, a wire harness is arranged between an engine room and a passenger room. The wire harness communicates therebetween through a through hole formed on a body panel located between the engine room and the passenger room. In order to avoid a breakage of the wire harness by contacting the body panel, a grommet is mounted on the through hole.

In the conventional art, a grommet having a configuration as shown in FIG. 7 is used. In FIG. 7, the grommet has a large diameter portion 2 having an engaging recess 2A for engaging the through hole of the body panel and a small diameter portion 4 for fixing the wire harness passing through the large diameter portion 2.

In the engine room, the rain drops enter into the engine room while running. Thus, in order to prevent the rain drops from entering into the passenger room, the grommet 1 is filled up with a liquid molding material 5. For filling the liquid molding material, a cylindrical filling cup 6 is provided at an inner side of the large diameter portion 2.

Further, in order to avoid the transmission of noise from the engine room to the passenger room through the grommet, an air layer 7 is provided at an inner portion of the large diameter portion 2. This air layer 7 is defined by a sound insulating membrane 8 which is integrally formed on the large diameter portion 2 at the other side of the large diameter 2 and is turned back into the small diameter portion 4 and an inner wall surface 2B of the large diameter portion 2.

However, in the conventional grommet, on the assembling line, an operator touches the wire harness and the wire harness 3 is slanted with respect to the body panel to incline the cylindrical filling cup 6. As shown in FIG. 8, a tip portion of the sound insulating membrane is disengaged with the cylindrical filling cup 6 to communicate the air layer 7 with the external portion. Under this condition, the air layer is not effected as considered to omit it, and a sound-insulating characteristic is extremely inferior.

Further, the grommet is formed by the rubber as the elastic material. When the slanted wire harness is to be adjusted to the correct position, the sound-insulating membrane 8 is extended toward a direction opposite to the small diameter portion 4 by the elastic force of the grommet as shown in FIG. 9. As usual, a step of filling the molding material is subjected from a direction A. Thus, if the sound-insulating membrane 8 is opposite to the small diameter portion 4, the mold filling operation becomes very complicated because the sound-insulating membrane becomes an obstacle.

SUMMARY OF INVENTION

With the above problems in view, it is an object of this invention to provide a harness grommet in which a sound-insulating membrane can be positively inverted without being folded in a crushed manner, and even if a wire harness is much inclined abruptly, the sound-insulating membrane will not be withdrawn from an outer tubular portion, and besides the increase of the cost due to the provision of a sound-insulating membrane-retaining means is prevented.

The above object has been achieved by a harness grommet of the present invention including an inner tubular portion, provided within an outer tubular portion, and a flexible portion extending from said inner tubular portion in a flaring manner, wherein said flexible portion is turned back into said outer tubular portion to form a sound-insulating air layer; CHARACTERIZED in that a cylindrical portion extends from said flexible portion, and an inverting folding portion is formed at the boundary between said flexible portion and said cylindrical portion, and a sound-insulating membrane is formed by said flexible portion and said cylindrical portion. Preferably, an outer diameter of said cylindrical portion is larger than an inner diameter of said outer tubular portion.

As described above, in the present invention, the cylindrical portion is inverted at the inverting folding portion, so that the flexible portion is inverted in a curved manner. Therefore, the flexible portion will not be folded in a crushed manner as in the conventional construction, and therefore the sound-insulating membrane can be positively inserted smoothly into the outer tubular portion, so that the air layer is positively formed easily. When the sound-insulating membrane is inverted, the cylindrical portion is firmly held in intimate contact with the inner surface of the outer tubular portion by the restoring force of the inverting folding portion, and therefore when the grommet is bent as a result of inclining of the wire harness, and is restored into an assembled condition, the cylindrical portion is positively prevented from being withdrawn from the outer tubular portion. And besides, the cylindrical portion does not need to have any retaining means as used in the conventional construction, and therefore the construction is simplified, and the molding cost and part cost are reduced. In the present invention, the cylindrical portion is more firmly held in intimate contact with the inner surface of the outer tubular portion, and therefore the withdrawal of the cylindrical portion is prevented more positively, and the necessity of provision of the retaining means is more positively eliminated, and the reduction of the costs is ensured.

DETAILED DESCRIPTION OF PREFERRED EMBODIMENTS

First Embodiment

First embodiment of the present invention will now be described in detail with reference to FIGS. 3 to 6.

Figure 3:
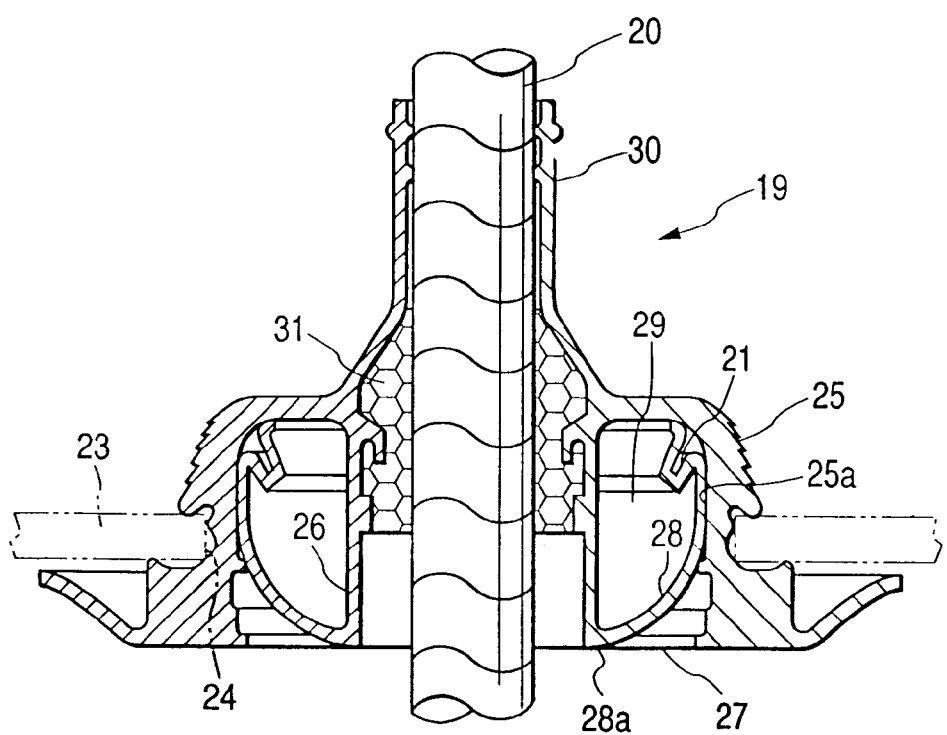
FIG. 3 is a vertical cross-sectional view of a harness grommet of first embodiment in its assembled condition.

As shown in FIG. 3, this grommet 19 includes a cup-shaped outer tubular portion 25 of a larger diameter for fitting in a through hole 24, formed through a car body panel 23, a thin inner tubular portion 26 formed within the outer tubular portion 25 in integral relation thereto, and a flexible, sound-insulating membrane (flexible portion) 28 which is turned up or back from an outer end of the inner tubular portion 26 to close an open end 27 of the outer tubular portion 25. The sound-insulating membrane 28 forms an air layer 29 within the outer tubular portion 25 so as to prevent the sound in an engine room from transmitting into a passenger room through the harness grommet 19.

The inner tubular portion 26 extends axially within the outer tubular portion 25, and the sound-insulating membrane 28 is turned back (inverted) generally acutely at its proximal portion 28a, and is held in contact with an inner surface 25a of the outer tubular portion 25 in a curved manner. A wire harness 20 is passed through the bore of the inner tubular portion 26, and extends outwardly from a tubular portion 30 of a smaller diameter extending from the outer tubular portion 25. A resin 31 for sound-insulating purposes is filled in the inner tubular portion 26 so as to prevent rain water from intruding through a gap between the outer periphery of the wire harness 20 and the tubular portion 30. A recessed portion 21 for retaining purposes is formed at the distal end of the sound-insulating membrane over the entire periphery thereof, and convex portions 22 for engagement with the recessed portion 21 are formed on the inner surface 25a of the outer tubular portion 25 over the entire periphery thereof as shown in FIG. 4.

Figure 4:
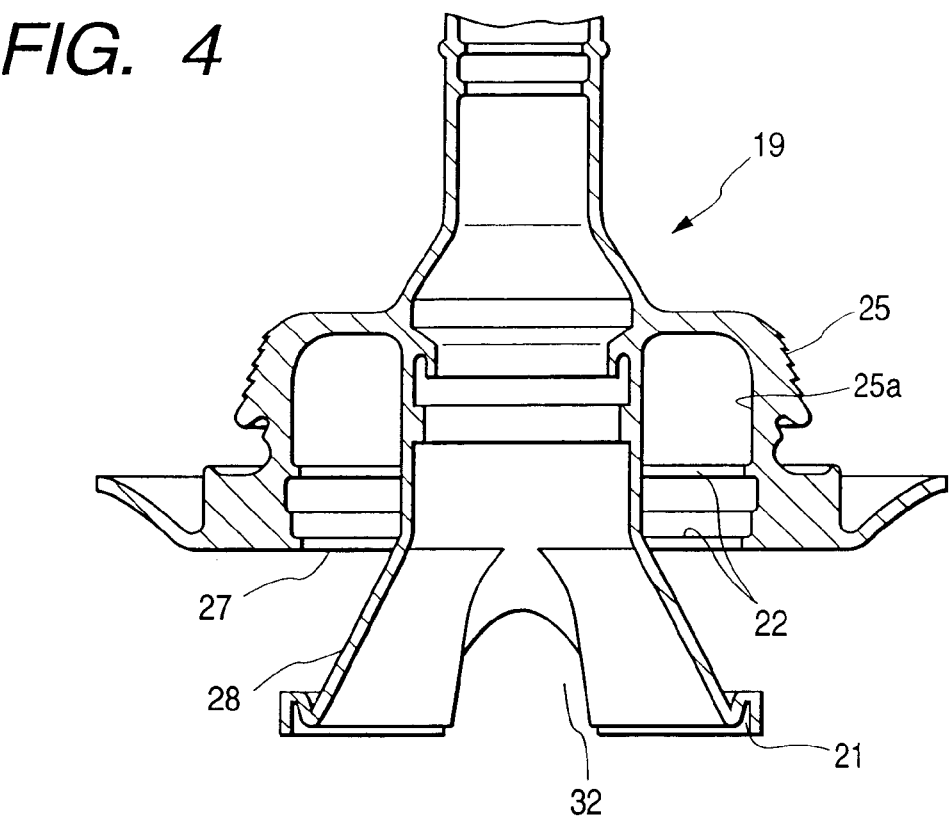
FIG. 4 is a vertical cross-sectional view of the harness grommet of the first embodiment, showing its configuration at the time when it is molded.

FIG. 4 shows the harness grommet 19 of its original configuration at the time when it is molded of rubber, and the sound-insulating membrane 28 projects outwardly from the open end 27 of the outer tubular portion 25 in a flaring manner. A notch 32 is formed in the sound-insulating membrane 28, and extends axially from the distal end thereof.

Figure 5:
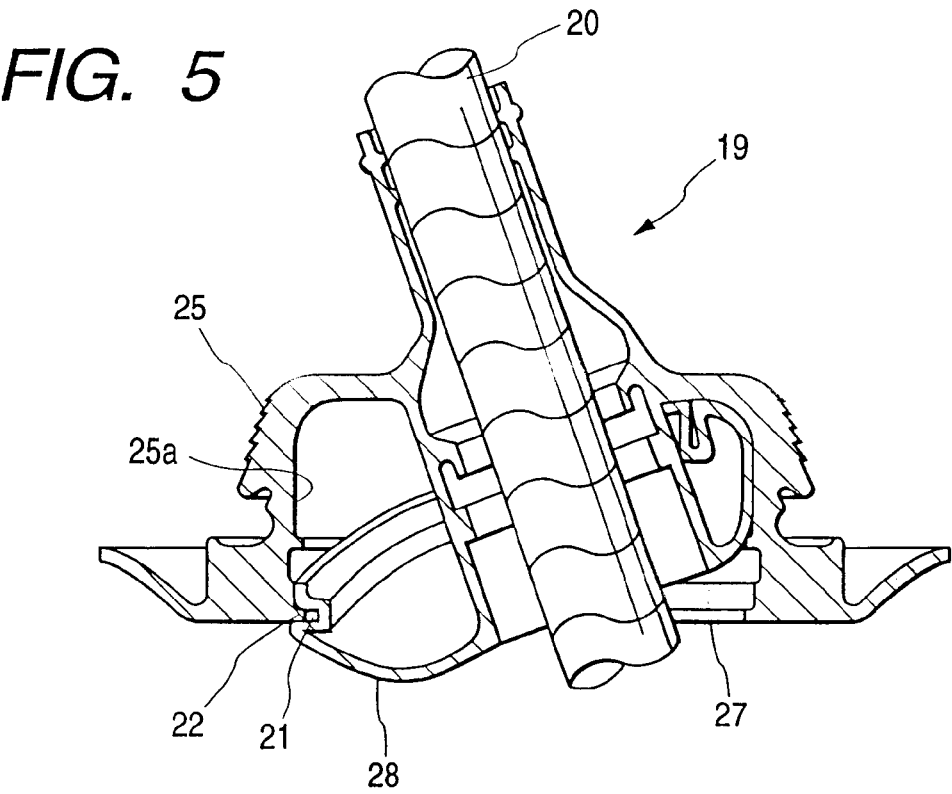
FIG. 5 is a vertical cross-sectional view of the harness grommet of the first embodiment in its bent condition.

FIG. 5 shows a condition in which the wire harness 20 is bent and inclined, and the inclined side of the sound-insulating membrane 28 is displaced toward the open end 27 of the outer tubular portion 25 along the inner surface 25a thereof, and the retaining recessed portion 21 becomes engaged with the convex portion 22, thereby preventing the sound-insulating membrane 28 from being withdrawn from the outer tubular portion 25.

Figure 6:
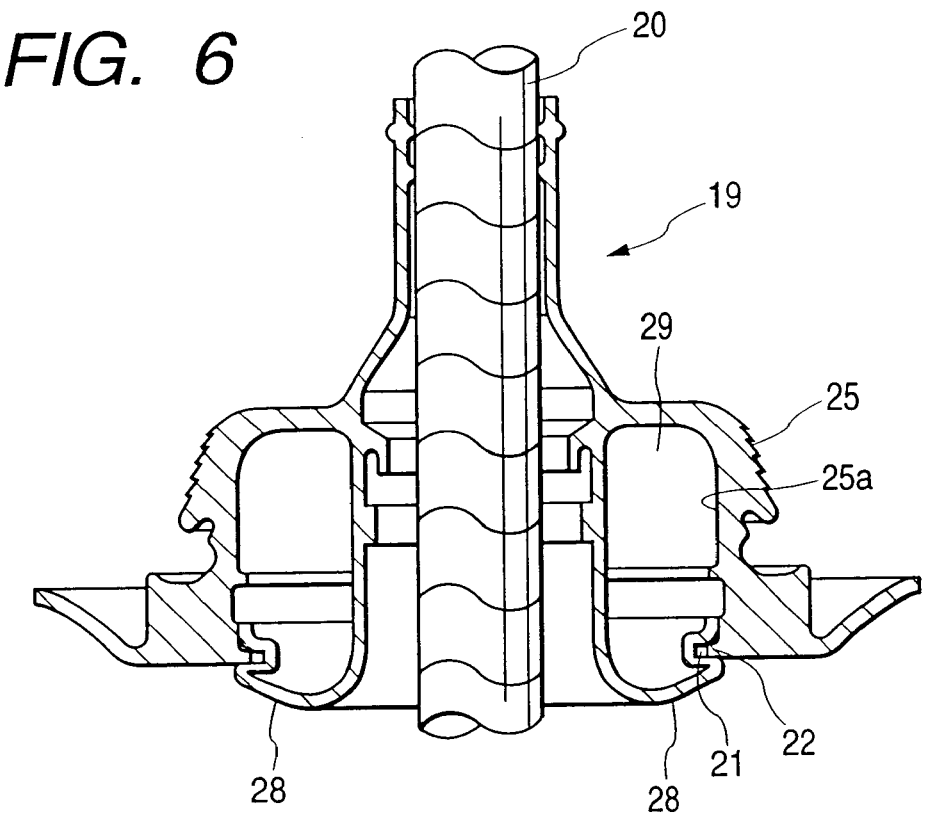
FIG. 6 is a vertical cross-sectional view of the harness grommet of the first embodiment showing a condition in which it is restored from the bent condition.
Figure 7:
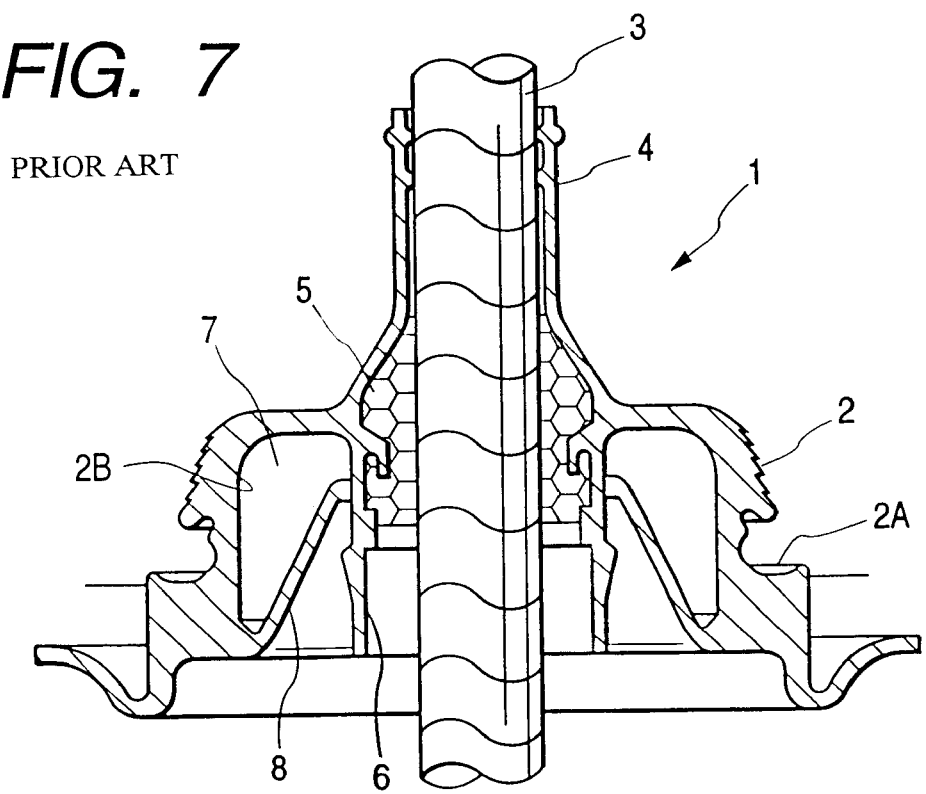
FIG. 7 is a vertical cross-sectional view of a conventional harness grommet passing through a through hole.
Figure 8:
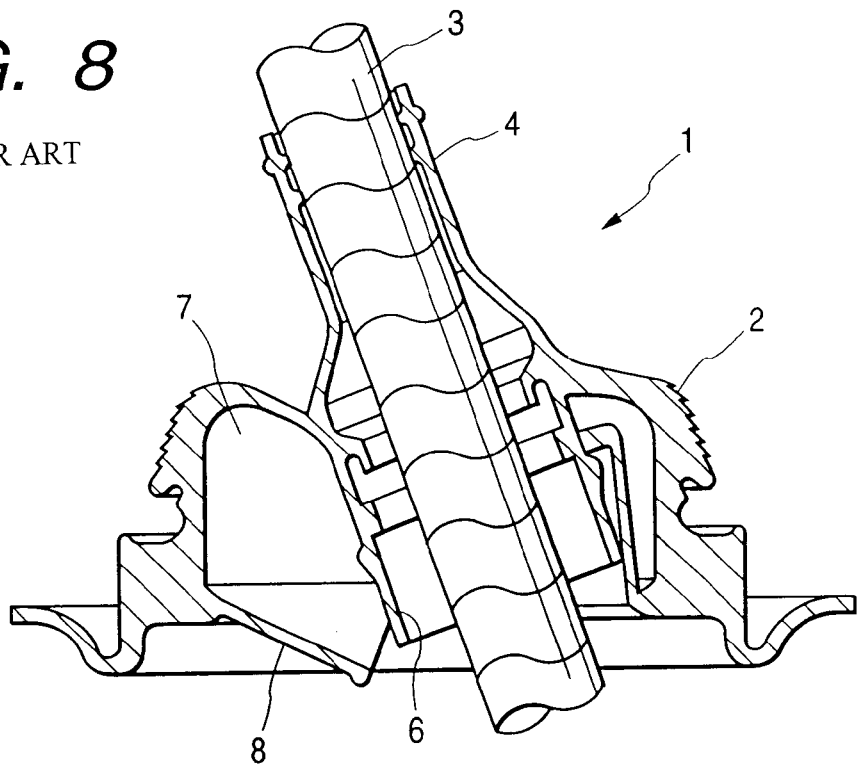
FIG. 8 is a vertical cross-sectional view of the conventional harness grommet positioned in a slanted condition.
Figure 9:
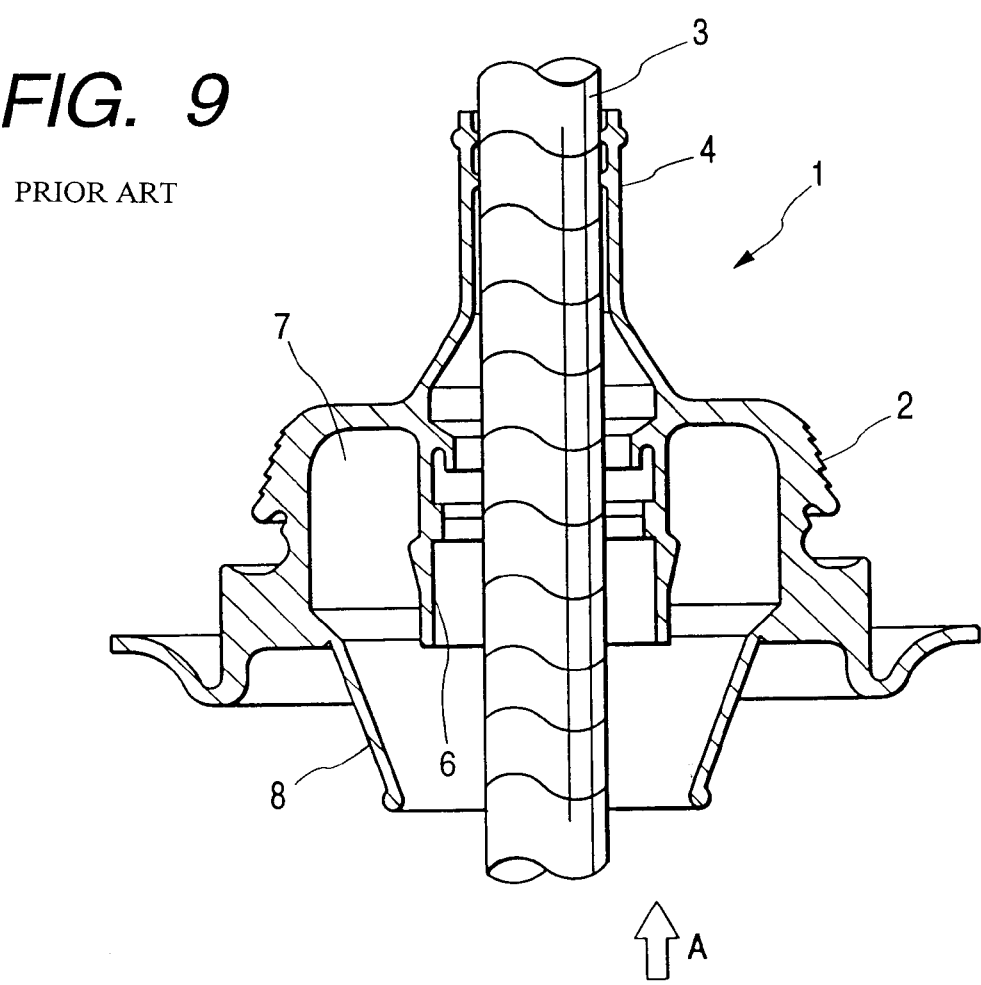
FIG. 9 is a vertical cross-sectional view of the conventional harness grommet showing a condition in which it is restored from the bent condition.

FIG. 6 shows a condition in which the wire harness 20 is restored into its original configuration, and extends straight in the axial direction. The inclined side of the sound-insulating membrane 28 remains in the condition shown in FIG. 5, and that side of the insulating membrane 28, facing away form this inclined side, is displaced toward the open end of the outer tubular portion 25 along the inner surface 25a thereof, and the retaining recessed portion 21 becomes engaged with the convex portion 22 on the inner surface 25a, thereby preventing the sound-insulating membrane 28 from being withdrawn from the outer tubular portion 25. Thus, even if the wire harness 20 is inclined, so that the harness grommet 19 is bent, the sound-insulating membrane 28 keeps the air layer 29, thereby preventing the propagation of noises.

Second Embodiment

Second embodiment of the present invention will now be described in detail with reference to FIGS. 1 and 2.

Figure 1:
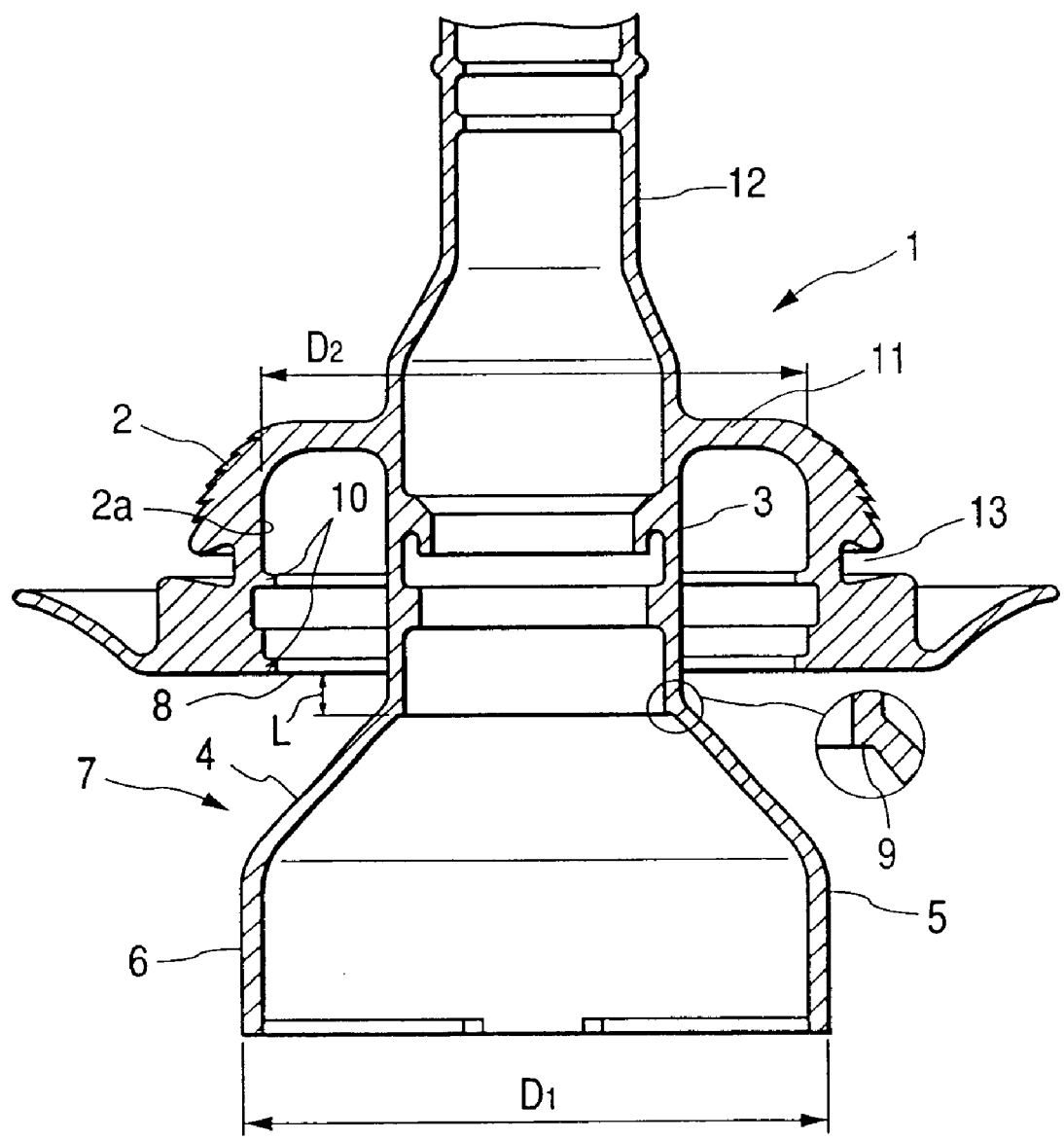
FIG. 1 is a vertical cross-sectional view of a second embodiment of a harness grommet of the present invention, showing its configuration at the time when it is molded.

FIG. 1 shows a harness grommet of the present invention in its original condition at the time when it is molded of rubber.

The harness grommet 1 of this embodiment includes an inner tubular portion 3, formed axially within a cup-shaped outer tubular portion 2 in integral relation thereto, a flexible portion 4 extending from one end of the inner tubular portion 3 in a flaring manner (that is, increasing in diameter progressively outwardly), and a cylindrical portion 6 extending straight axially from an outer end of the flexible portion 4 through an inverting folding portion 5. A sound-insulating membrane 7 is formed by the flexible portion 4 and the cylindrical portion 6.

The one end of the inner tubular portion 3 projects slightly (distance L) outwardly beyond an open end 8 of the outer tubular portion 2. Formed at the boundary between the inner tubular portion 3 and the flexible portion 4 is a shoulder portion 9 which is defined by an inner portion of the one end of the inner tubular portion 3, and the flexible portion 4 extends obliquely outwardly from that portion of the one end of the inner tubular portion 3 disposed radially outwardly of the shoulder portion 9. The inverting folding portion 5 of a curved shape is formed at the boundary between the flexible portion 4 and the cylindrical portion 6. In this embodiment, the flexible portion 4 and the cylindrical portion 6 are generally equal in length to each other.

Figure 2:
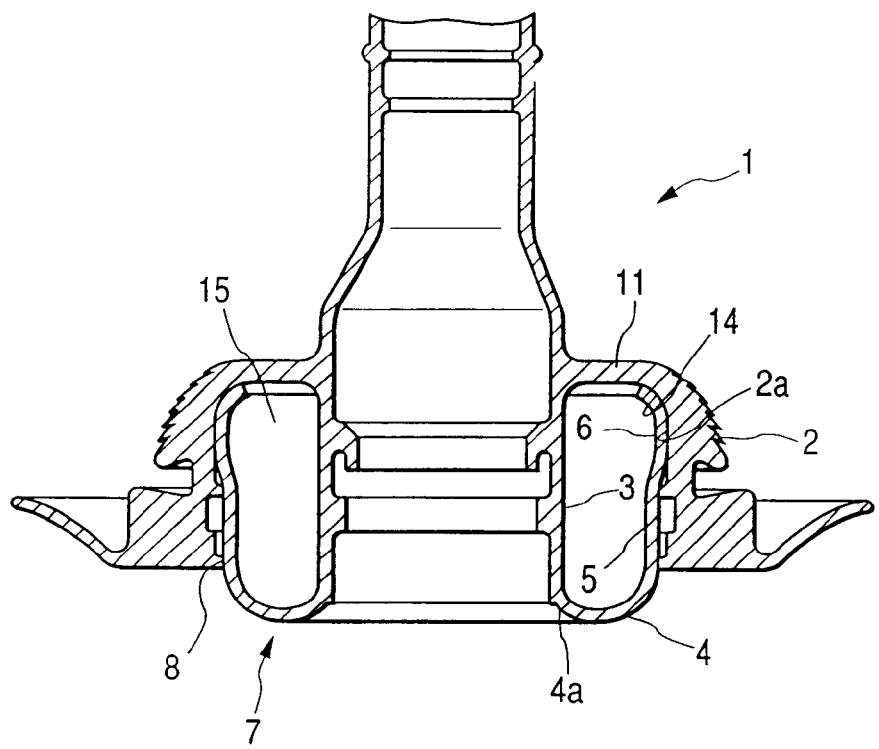
FIG. 2 is a vertical cross-sectional view of the harness grommet in its assembled condition.

An outer diameter $D_1$ of the cylindrical portion 6 is larger than an inner diameter $D_2$ of the outer tubular portion 2, and in an inverted condition shown in FIG. 2, the cylindrical portion 6 is elastically held in intimate contact with an inner surface 2a of the outer tubular portion 2. The cylindrical portion 6 does not have any convex and concave portions, and extends straight, and forms a peripheral wall over an entire periphery thereof. Thus, this cylindrical portion 6 is much simpler in construction as compared with the conventional construction (FIG. 4).

As in the construction of the first embodiment, a pair of convex portions 10 are formed on the inner surface 2a of the outer tubular portion 2. One of the two convex portions 10 is provided generally centrally of the axial length of the outer tubular portion 2 whereas the other convex portion 10 is provided at the open end of the outer tubular portion 2. These convex portions 10 serve as non-slip means for the sound-insulating membrane, and assist in preventing the sound-insulating membrane 7 from being withdrawn from the outer tubular portion 2. The inner tubular portion 3 is connected integrally to a central portion of a proximal wall 11 of the outer tubular portion 2, and the other end of the inner tubular portion 3 projects outwardly from the proximal wall 11, and a tubular portion 12 of a smaller diameter for passing a harness therethrough extends from the other end of the inner tubular portion 3. A fitting groove 13 for engagement with a car body panel (not shown) is formed in the outer peripheral surface of the outer tubular portion 2 over the entire periphery thereof.

In the molded condition shown in FIG. 1, the cylindrical portion 6 is inverted at the inverting folding portion 5, and is inserted into the outer tubular portion 2 as shown in FIG. 2. When the cylindrical portion 6 is thus inverted, the flexible portion 4 is turned or folded back to be curved into a generally U-shape. Since the flexible portion 4 is thus curved into a generally U-shape, a proximal portion 4a of the flexible portion 4 is not bent acutely (as described above for the construction of the first embodiment), but is curved smoothly into a substantially arcuate shape. As a result, the sound-insulating membrane 7 can be smoothly inserted into the outer tubular portion 2 in a curved condition without being folded in a crushed manner.

The flexible portion 4 enters the outer tubular portion 2 through the open end 8, and moves along the inner surface 2a, and reaches a position (as at 5) slightly advanced axially from the open end 8. The cylindrical portion 6 enters the outer tubular portion 2, and moves axially along the inner surface 2a, and reaches a curved corner portion 14 at the boundary between the peripheral wall of the outer tubular portion 2 and the proximal wall 11. The cylindrical portion 6 is held in intimate contact with the inner surface 2a of the outer tubular portion 2, and the distal end portion of the cylindrical portion 6 is held in intimate contact with the inner surface of the corner portion 14 in a curved manner.

The inverting folding portion 5 at the boundary between the flexible portion 4 and the cylindrical portion 6 extends straight. The cylindrical portion 6 and the flexible portion 4 are pressed against the inner surface 2a of the outer tubular portion 2 by a force (spring force) to restore the inverting folding portion 5 into its initial condition. Therefore, even if the wire harness 20 is much inclined abruptly, so that the harness grommet 1 is much bent, the cylindrical portion 6 is firmly held in intimate contact with the inner surface 2a of the outer tubular portion 2, and therefore will not be forced out of the outer tubular portion 2.

The cylindrical portion 6 does not have any retaining mechanism as used in the construction, and therefore even if the cylindrical portion 6 is moved toward the open end 8 along the inner surface 2a of the outer tubular portion 2, the cylindrical portion 6 slides along the inner surface 2a of the outer tubular portion 2 to be returned to its original position when the wire harness 20 (FIG. 6) is restored into the straight condition. Therefore, an air layer 15 inside of the sound-insulating membrane 7 is positively kept.

In FIG. 1, the outer diameter $D_1$ of the cylindrical portion 6 is larger than the inner diameter $D_2$ of the outer tubular portion 2, and with this construction, also, the cylindrical portion 6, when inverted, is firmly held in intimate contact with the inner surface 2a of the outer tubular portion 2. Incidentally, even if the outer diameter $D_1$ of the cylindrical portion 6 is generally equal to the inner diameter $D_2$ of the outer tubular portion 2, the relatively-high intimate contact force is obtained by the restoring force of the inverting folding portion 5. Therefore, the cylindrical portion 6 does not need to have a retaining recessed portion such as the recessed portion 21 (FIG. 4) used in the construction, and the sound-insulating membrane 7 is simplified in configuration, and the construction of a mold is also simplified.

As described above, in the present invention, the cylindrical portion is inverted at the inverting folding portion, so that the flexible portion is inverted in a curved manner. Therefore, the flexible portion will not be folded in a crushed manner as in the construction, and therefore the sound-insulating membrane can be positively inserted smoothly into the outer tubular portion, so that the air layer is positively formed easily. When the sound-insulating membrane is inverted, the cylindrical portion is firmly held in intimate contact with the inner surface of the outer tubular portion by the restoring force of the inverting folding portion, and therefore when the grommet is bent as a result of inclining of the wire harness, and is restored into an assembled condition, the cylindrical portion is positively prevented from being withdrawn from the outer tubular portion. And besides, the cylindrical portion does not need to have any retaining means as used in the construction, and therefore the construction is simplified, and the molding cost and part cost are reduced. In the present invention, the cylindrical portion is more firmly held in intimate contact with the inner surface of the outer tubular portion, and therefore the withdrawal of the cylindrical portion is prevented more positively, and the necessity of provision of the retaining means is more positively eliminated, and the reduction of the costs is ensured.

What is claimed is:

1. A harness grommet comprising:
   an inner tubular portion, provided within an outer tubular portion, and
   a flexible portion extending from said inner tubular portion in a flaring manner, said flexible portion is turned back into said outer tubular portion to form a sound-insulating air layer;
   a cylindrical portion extending from said flexible portion, and
   an inverting folding portion is formed at the boundary between said flexible portion and said cylindrical portion, and
   a sound-insulating membrane is formed by said flexible portion and said cylindrical portion.

2. A harness grommet according to claim 1, in which an outer diameter of said cylindrical portion is larger than an inner diameter of said outer tubular portion.

3. A harness grommet comprising:
   an outer tubular portion including at least one convex portion formed on an inner surface of said outer tubular portion;
   an inner tubular portion provided within said outer tubular portion; and
   a flexible portion including at least one retaining recessed portion, said flexible portion extending from said inner tubular portion to form a sound-insulating air layer.

4. The harness grommet according to claim 3, wherein said retaining recessed portion engages with said convex portion when a wire harness is inclined.

5. The harness grommet according to claim 4, wherein said retaining recessed portion engages with said convex portion when said wire harness is returned to its original configuration.

* * * * *